(12) United States Patent
Honda

(10) Patent No.: US 7,187,088 B2
(45) Date of Patent: Mar. 6, 2007

(54) POWER SUPPLY APPARATUS FOR ELECTRIC VEHICLE

(75) Inventor: Satoshi Honda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 445 days.

(21) Appl. No.: 10/646,776

(22) Filed: Aug. 25, 2003

(65) Prior Publication Data

US 2004/0135434 A1 Jul. 15, 2004

(30) Foreign Application Priority Data

Aug. 28, 2002 (JP) .............................. 2002-249311

(51) Int. Cl.
*B60L 1/00* (2006.01)
(52) U.S. Cl. ....................................................... 307/9.1
(58) Field of Classification Search .................. 307/9.1
See application file for complete search history.

(56) References Cited

U.S. PATENT DOCUMENTS

| 4,479,083 A | * | 10/1984 | Sullivan | ...................... 320/123 |
| 6,674,180 B2 | * | 1/2004 | Gale et al. | ...................... 290/7 |
| 2002/0003525 A1 | * | 1/2002 | Hwang | ........................ 345/102 |
| 2003/0012038 A1 | * | 1/2003 | Welches et al. | ................ 363/34 |

FOREIGN PATENT DOCUMENTS

JP 06115479 A 4/1994

* cited by examiner

*Primary Examiner*—Brian Sircus
*Assistant Examiner*—Dru Parries
(74) *Attorney, Agent, or Firm*—Birch, Stewart, Kolasch & Birch, LLP

(57) ABSTRACT

To provide a power supply apparatus for an electric vehicle wherein the insulation of a power supply line for supplying a drive voltage to an electric motor can be simplified and the cost for the insulation can be reduced. A power supply apparatus for an electric vehicle includes batteries for driving a motor and general electric parts. An node A of an intermediate voltage of 24 V between a drive voltage of 48 V of the batteries and the ground voltage is connected to a ground line for the general electric parts. An inverter produces a voltage to be applied to the general electric parts based on the drive voltage of 48 V of the batteries and the intermediate voltage of 24 V. By adjusting the duty ratio of the inverter, a voltage of AC 24 V or AC 12 V can be applied to the general electric parts.

18 Claims, 4 Drawing Sheets

POWER SUPPLY APPARATUS FOR ELECTRIC VEHICLE

CROSS-REFERENCE TO RELATED APPLICATIONS

The present application claims priority under 35 USC 119 to Japanese Patent Application Nos. 2002-249311 filed on Aug. 28, 2002 the entire contents thereof are hereby incorporated by reference.

BACKGROUND OF THE INVENTION

1. Field of the Invention

This invention relates to a power supply apparatus for an electric vehicle such as a motor-driven scooter. More particularly, to a power supply apparatus for an electric vehicle that can simplify insulation of a power supply line of a vehicle power supply and can reduce the cost for the insulation.

2. Description of the Background Art

It is necessary for a power supply apparatus for an electric vehicle to output a high voltage for driving an electric motor for a driving apparatus and a low voltage for driving other vehicle equipment such as general electric parts.

A conventional power supply apparatus for an electric vehicle is disclosed in the Official Gazette of, for example, Japanese Patent Laid-Open No. Hei 6-115479. This power supply apparatus uses, for example, a battery of 48 V as a main power supply and supplies this voltage as it is as a drive voltage to a driving apparatus. The voltage of the battery is lowered by a DC stabilized power supply, for example, to 12 V, which is supplied to general electric parts such as a lamp apparatus and a control apparatus. In other words, from the main power supply of the high voltage, the high voltage (48 V) is directly supplied to the driving apparatus so that a sufficient power performance may be exhibited. In addition, from the DC stabilized power supply which lowers the voltage from the main power supply a stable low voltage (12 V) is generated that is necessary for the general electric parts such as the lamp apparatus. The control apparatus is supplied stably without being influenced, even if the power supply voltage of the main power supply exhibits a significant variation, by the variation of the power supply voltage so that the lamp apparatus may keep a sufficient amount of light emission and the control apparatus may operate stably.

However, the power supply apparatus for an electric vehicle described above is not configured considering such a case that a user performs maintenance of the general electric parts. This is because the voltage difference between a power supply line for the driving apparatus and a ground line for the general electric parts has a comparatively high value of 48 V. If the power supply apparatus described above is configured considering such a case that a user performs maintenance, then the insulation of the power supply line for the drive apparatus must be strengthened totally, and this configuration is complicated and increases the cost.

Also another power supply apparatus is available wherein a DC—DC converter is used for a DC stabilized power supply in order to obtain a low voltage for operating general electric parts. However, with such a power supply apparatus as just described, since the primary side and the secondary side are isolated from each other to prevent a high voltage leak therebetween, an increased cost is required. In addition, some loss is generated by a transformer or the like disposed inside of the converter. This loss is not preferable particularly with an electric vehicle from the point of view of effective utilization and assurance of a long life of the power supply.

SUMMARY AND OBJECTS OF THE INVENTION

It is an object of the present invention to provide a power supply apparatus for an electric vehicle wherein the insulation of a power supply line for supplying a drive voltage to an electric motor can be simplified and the cost for the insulation can be reduced and wherein the loss is low.

In order to solve the situation described above, according to the present invention, a power supply apparatus for an electric vehicle includes a vehicle power supply for driving an electric motor and other vehicle equipment wherein intermediate voltage application means are provided for setting a line defined by an intermediate voltage between a drive voltage and a ground voltage of the vehicle power supply as a ground line for the other vehicle equipment, and power supply means for producing a voltage to be applied to the other vehicle equipment based on the drive voltage of the vehicle power supply and the intermediate voltage.

Further, according to the present invention, the power supply apparatus for an electric vehicle provides the power supply means for producing a pulse voltage which varies high and low around the intermediate voltage.

Furthermore, according to the present invention, the power supply apparatus for an electric vehicle provides the power supply means that varies the duty ratio of the pulse voltage to adjust the voltage to be applied to the other vehicle equipment.

According to the present invention, since the voltage difference between the drive voltage of the vehicle power supply and the ground line for the other vehicle equipment such as electric parts can be reduced, the configuration considering such a case that a user performs maintenance of the electric parts can be simplified. For example, sufficient insulation can be achieved even if the insulation of the power supply line for the vehicle power supply is not strengthened very much. Therefore, simplification of the configuration can be achieved and the cost can be reduced.

Further, according to the present invention, the low voltage necessary for the other vehicle equipment such as electric parts can be obtained.

Furthermore, according to the present invention, the root-mean-square voltage to be applied to the other vehicle equipment such as general electric parts can be adjusted by changing the duty ratio of the pulse voltage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
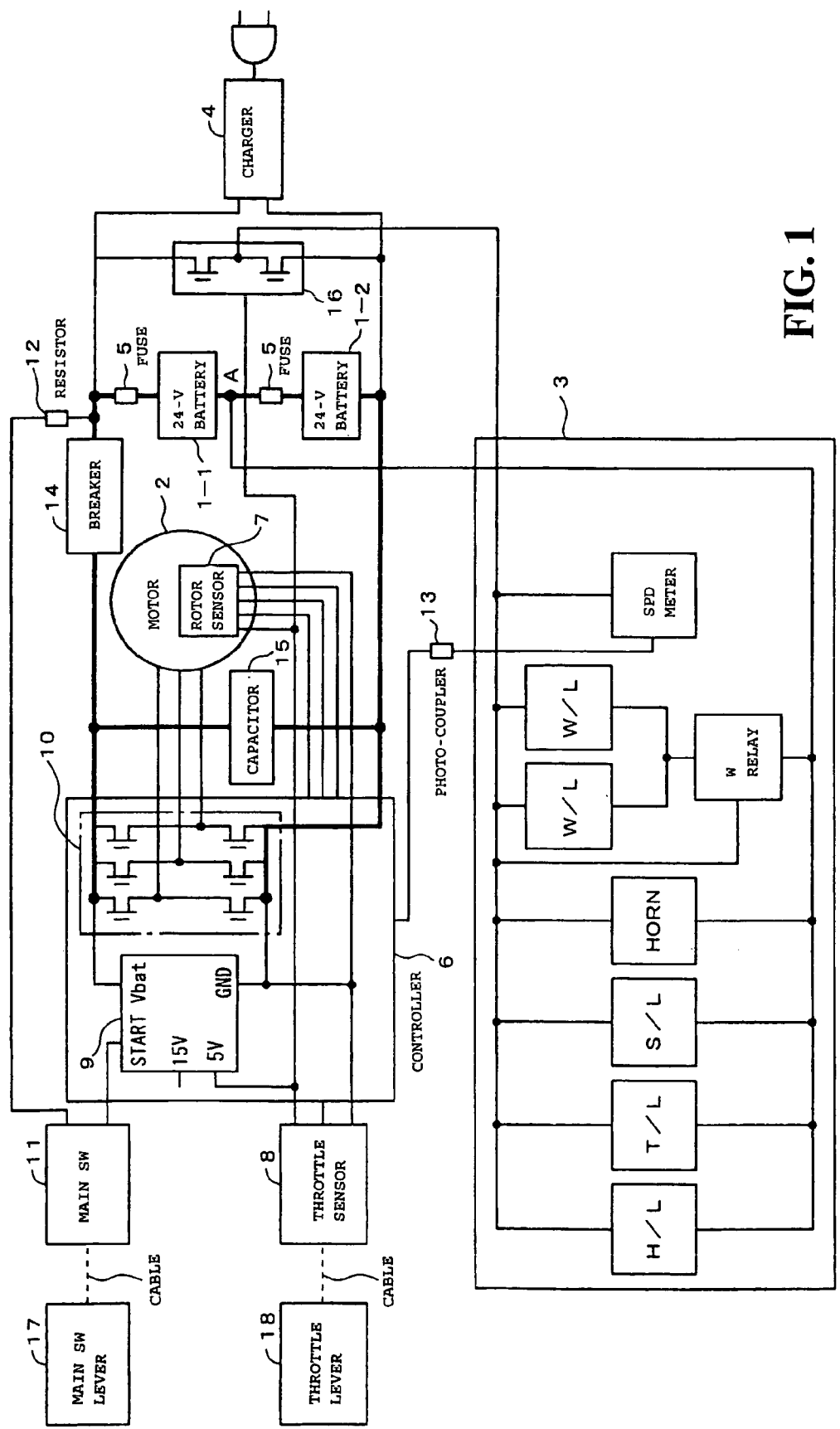
FIG. 1 is a block diagram showing an embodiment of a power supply apparatus for an electric vehicle of the present invention.

In the following, the present invention is described in detail with reference to the drawings. FIG. 1 is a block diagram showing an embodiment of a power supply apparatus for an electric vehicle of the present invention wherein two batteries 1-1 and 1-2 are connected in series to form a drive power supply for driving a motor while a node A of the two batteries 1-1 and 1-2 is connected to a ground line for general electric parts 3 such that an intermediate voltage of 24 V between the drive voltage of 48 V of the batteries 1-1 and 1-2 and the ground voltage is applied to the ground line for the general electric parts 3 and an inverter 16 is used to produce a voltage to be applied to the general electric parts 3 from the voltage of the batteries 1-1 and 1-2.

The batteries 1-1 and 1-2 can be charged up from a commercial power supply or the like through a charger 4 and fuses 5, 5. A controller 6 includes a controlling circuit block 9 to which an output of a rotor sensor 7 for detecting a rotational angle of a motor 2 and an output of a throttle sensor 8 are inputted, and a drive circuit 10 including FETs controlled by the controlling circuit block 9.

The general electric parts 3 include a headlamp, a tail lamp, a stop lamp, a horn, blinkers and a speedometer. A main switch 11 supplies the voltage of the batteries 1-1 and 1-2 to the controller 6 to activate the controller 6. A resistor 12 for preventing an electric shock or short-circuiting is inserted in a lead line to the main switch 11.

The controller 6 and the speedometer of a general electric part 3 are connected to each other by a photo-coupler 13, and a breaker 14 is interposed in a power supply line between the battery 1-1 and the controller 6 while a capacitor 15 is connected between the power supply line and the ground line.

It is to be noted that, in the present embodiment, the main switch 11 and a main switch lever 17, and the throttle sensor 8 and a throttle lever 18, are coupled to each other each by a cable. Consequently, connection lines to the main switch 11 and the throttle sensor 8 may not be laid long to reduce such chances that the lines may contact with the ground line for the general electric parts 3.

The power supply apparatus of the present embodiment has such a configuration as described above, wherein the batteries 1-1 and 1-2 function as a vehicle power supply for driving the electric motor and other vehicle apparatus. The configuration wherein the node A of the batteries 1-1 and 1-2 is connected to the ground line of the general electric parts 3 functions as an intermediate voltage application means for setting a line defined by an intermediate voltage between the drive voltage and the ground voltage of the vehicle power supply as a ground line for the other vehicle equipment. The inverter 16 functions as power supply means for producing a voltage to be applied to the other vehicle equipment based on the drive voltage of the vehicle power supply and the intermediate voltage.

Subsequently, action of the power supply apparatus is described. First, if the main switch 11 is switched on by an operation of the main switch lever 17, then the voltage of the batteries 1-1 and 1-2 is supplied to the controller 6 through the main switch 11 to start up the controller 6. The controller 6 receives outputs of the rotor sensor 7 and the throttle sensor 8 as inputs thereto and controls the driving of the motor 2 based on the inputs.

The controlling circuit block 9 of the controller 6 produces the voltage of 5 V and supplies it to the inverter 16 to activate the same. The inverter 16 supplies a voltage which varies around the intermediate voltage of 24 V with the voltage of the two batteries 1-1 and 1-2, that is, the voltage which varies between 0 V and 48 V, to the power supply line for the general electric parts 3.

Meanwhile, the voltage of 24 V at the node A of the batteries 1-1 and 1-2 is applied to the ground line for the general electric parts 3. Therefore, the voltage of AC 24 V which varies within a range of ±24 V with reference to 24 V is supplied to the general electric parts 3. The voltage difference between the power supply line of the batteries 1-1 and 1-2 and the ground line for the general electric parts 3 is 24 V. This is equal to one half of the conventional voltage difference of 48 V.

Figures 2A, 2B:
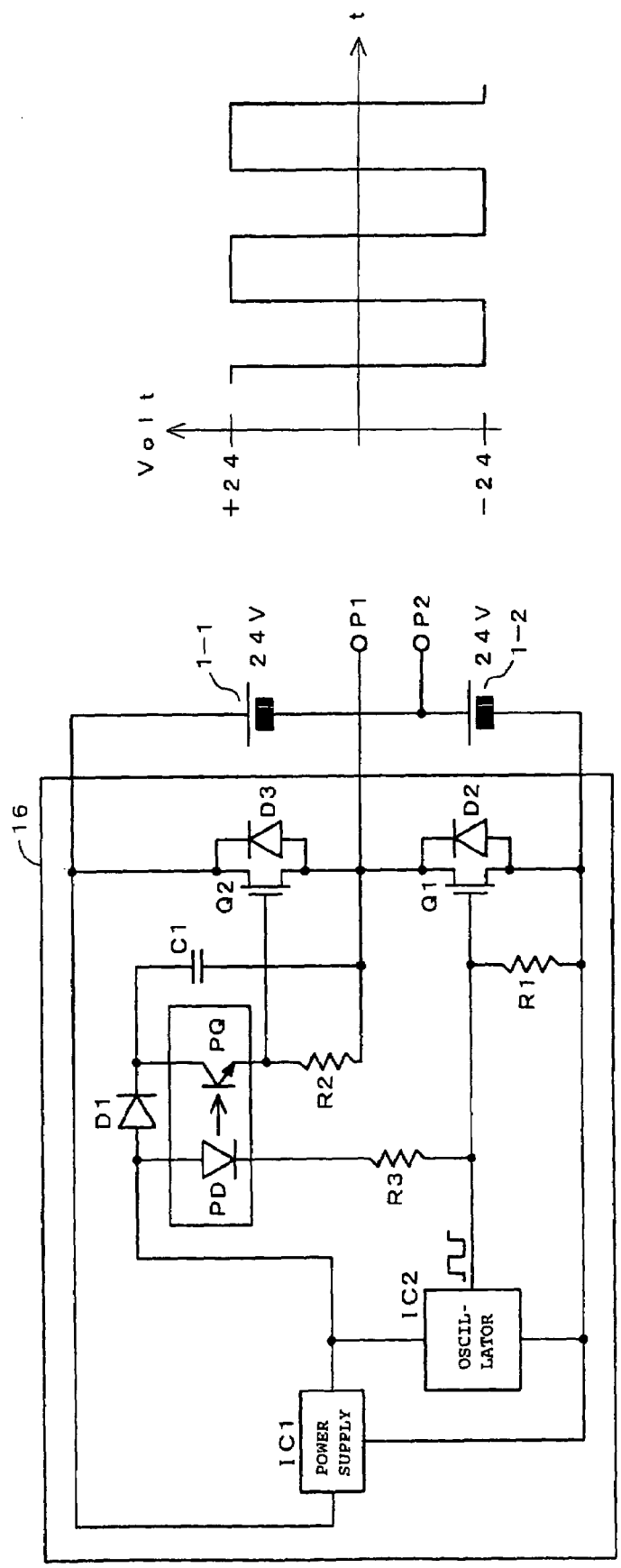
FIGS. 2(a) and 2(b) are circuit diagrams of an example of an inverter used in the present invention.

FIG. 2(a) shows an example of a circuit of the inverter 16 used in the present invention, and in the present example, AC 24 V is outputted. The inverter 16 as shown includes a power supply circuit IC1, an oscillator IC2, a photo-coupler composed of a photo-diode PD and a photo-transistor PQ, FETs Q1 and Q2, diodes D1 to D3, a capacitor C1, and resistors R1 to R3.

If a voltage is supplied (not shown) from the controller 6 to the power supply circuit IC1, then the power supply circuit IC1 is started up, and the oscillator IC2 is rendered operative with a voltage from the power supply circuit IC1. The oscillator IC2 outputs a pulse waveform having a duty ratio of 1/2. The FET Q1 is turned on with a high level of the pulse waveform, and −24 V with reference to an output terminal P2 is outputted at another output terminal P1. At this time, since the voltage difference between the source and the drain of the FET Q1 is 0 V, the capacitor C1 is charged by the power supply circuit IC1.

When the pulse waveform of the oscillator IC2 exhibits a low level, the FET Q1 is turned off. Simultaneously, the photo-diode PD emits light, and the photo-transistor PQ is turned on. Consequently, a charging voltage of the capacitor C1 is applied to the FET Q2. Consequently, the FET Q2 is turned on, and +24 V with reference to the output terminal P2 is outputted at the output terminal P1. The series of operations described above is repeated so that the voltage of AC 24 V with reference to the output terminal P2 as shown in FIG. 2(b) is outputted at the output terminal P1.

Figures 3A, 3B:
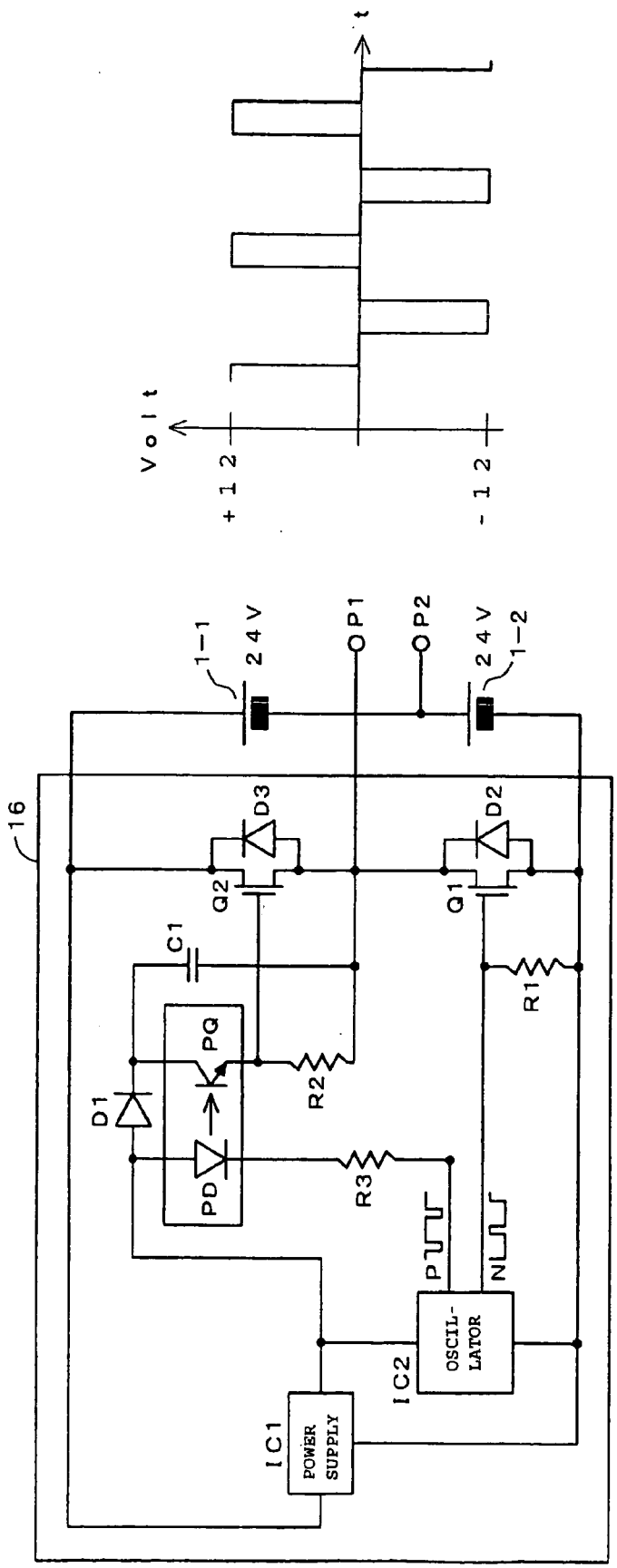
FIGS. 3(a) and 3(b) are circuit diagrams of another example of the inverter used in the present invention.

FIG. 3(a) shows another example of a circuit of the inverter 16 used in the present invention, and in the present example, AC 12 V is outputted. It is to be noted that reference characters that are the same as those in FIG. 2 denote equivalent portions. The present example is different from the inverter of FIGS. 2(a) and 2(b) in that the FETs Q1 and Q2 are controlled between on and off with such a duty ratio that the inverter 16 outputs a voltage FIG. 3(b) corresponding to AC 12 V in root-mean-square value.

When a voltage is supplied (not shown) from the controller 6 to the power supply circuit IC1, the power supply circuit IC1 is started up, and the oscillator IC2 is rendered operative with a voltage from the power supply circuit IC1. The oscillator IC2 outputs two pulse waveforms N and P whose high/low levels are opposite to each other and have phases displaced from each other. The FET Q1 is turned on when the pulse waveform N exhibits a high level, and −24 V with reference to the output terminal P2 is outputted at the output terminal P1. At this time, since the voltage difference between the source and the drain of the FET Q1 is 0 V, the capacitor C1 is charged by the power supply circuit IC1.

When the pulse waveform N exhibits a low level, the FET Q1 is turned off. When the pulse waveform P exhibits a low level soon, the photo-diode PD emits light, and the photo-transistor PQ is turned on. Consequently, a charging voltage of the capacitor C1 is applied to the gate of the FET Q2. As a result, the FET Q2 is turned on, and +24 V with reference to the output terminal P2 is outputted to the output terminal P1. The series of operations described above is repeated so that a voltage of AC 12 V in root-mean-square value with reference to the output terminal P2 as shown in FIG. 3(b) is outputted at the output terminal P1.

If the inverters 16 of FIGS. 2(a) and 3(a) are selectively used, then whether the rated voltage of the general electric parts 3 is 24 V or 12 V, the power supply apparatus can readily cope with the voltage.

Figure 4:
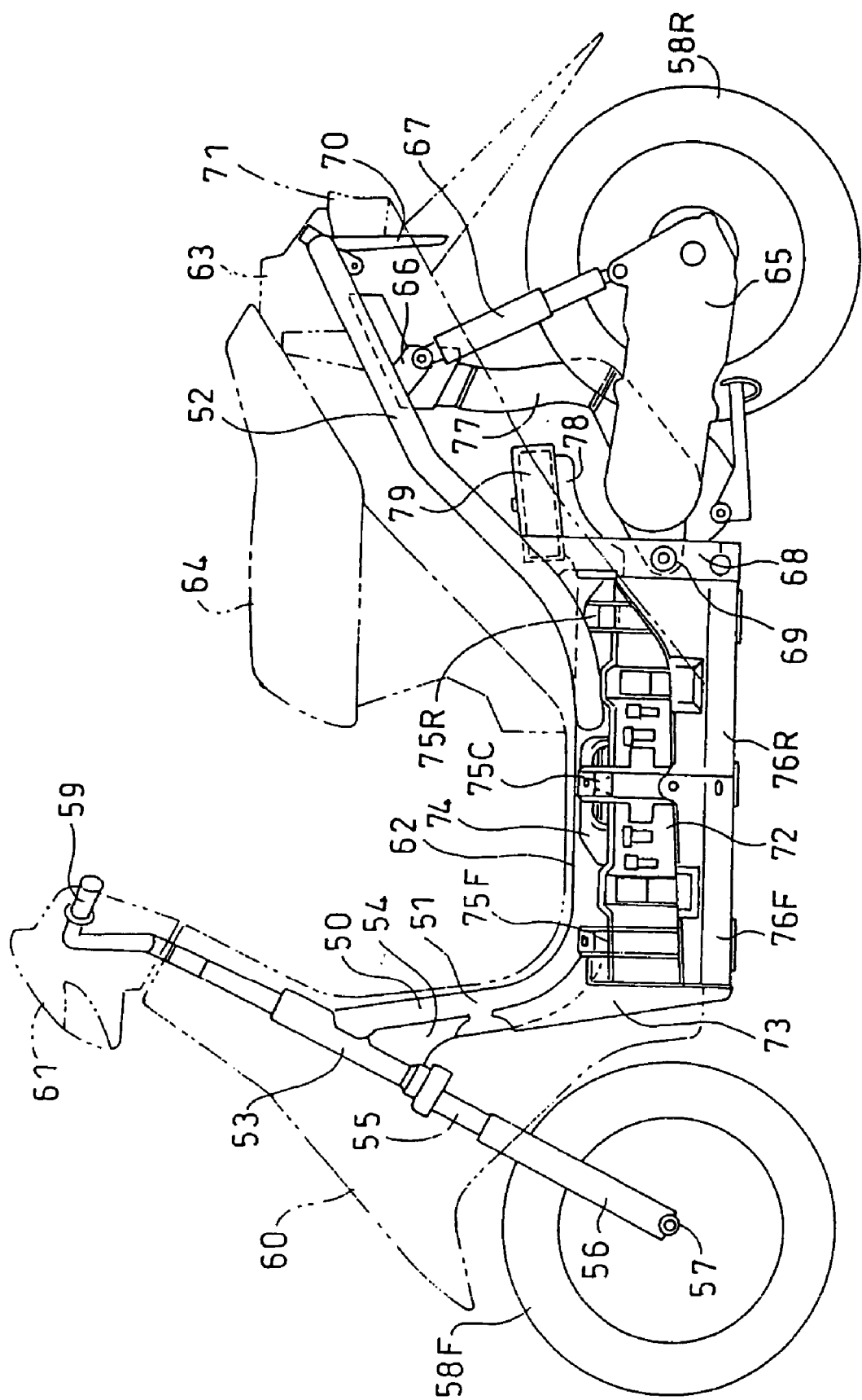
FIG. 4 is a schematic side elevational view showing an example of a motor-driven scooter to which the present invention can be applied.

FIG. 4 is a schematic side elevational view showing an example of a motor-driven scooter to which the present invention can be applied. Referring to FIG. 4, a scooter body frame 50 is generally formed from a main frame 51, and a side frame 52 which is bifurcated leftwardly and rightwardly and extends rearwardly from the main frame 51. A head pipe 53 is coupled to a front end portion of the main frame 51 and is reinforced by a gusset 54. A steering shaft 55 is supported for rotation on the head pipe 53, and a front fork 56 is coupled to a lower end portion of the steering shaft 55.

A wheel 58F supported by an axle 57 is mounted at a lower portion of the front fork 56, and a handle bar 59 is provided at an upper portion of the front fork 56. The steering shaft 55, front fork 56 and handle bar 59 form steering means. Further, though not shown, a headlamp is provided on the head pipe 53, and blinkers are provided on the handle bar 59.

The upper portion of the front fork 56 is covered with a front cover 60. A handle bar cover 61 is provided above the front cover 60. Grip portions of the handle bar 59 project leftwardly and rightwardly of the scooter body from the handle bar cover 61.

A center cover 62 is coupled to a lower portion of the front cover 60. A body cover 63 is coupled to a rear portion of the center cover 62. A seat 64 is supported above the body cover 63, and a rear portion of the scooter body above a power unit 65 is covered with the body cover 63. The power unit 65 includes an electric motor as a driving apparatus and a transmission.

A rear wheel 58R is supported on the power unit 65. Further, a rear cushion 67 is attached between the power unit 65 and the side frame 52 through an upper mounting bracket 66. A mounting pipe 68 is coupled to the side frame 52, and the power unit 65 is supported by the mounting pipe 68 through a pivot shaft 69. A number plate mounting portion 70 and a tail lamp 71 are provided at a rear portion of the body cover 63.

A battery unit 72 is disposed at a lower portion of the main frame 51 and is supported by brackets 73 and 74 and is secured at front, rear and central portions thereof with securing bands 75F, 75R and 75C, respectively. Further, the battery unit 72 is covered from below with lids 76F and 76R.

The power unit 65 is cooled with air circulating in a duct tube 77, and the battery unit 72 is cooled with air circulating in a rear duct 78 and an air-exhaust ventilator 79.

The power from the battery unit 72 is supplied to the electric motor of the power unit 65 and the general electric parts such as the headlamp, blinkers and tail lamp through a power supply mechanism disposed at a suitable location. It is to be noted that a command to the power supply mechanism is outputted in response to an operation of one of a throttle grip and various switches provided on the handle bar 59. The present invention is applied to the power supply mechanism mentioned above.

The present invention can be applied not only to a motor-driven scooter but also to electric vehicles which include a vehicle power supply for driving an electric motor and other vehicle equipment. Further, the nominal voltage to the other vehicle apparatus is not limited to 24 V or 12 V, and even if the nominal voltage is any other value, the voltage having the suitable value can be outputted readily by changing the duty ratio of the inverter.

As is apparent from the foregoing description, according to the present invention, since the voltage difference between the drive voltage of the vehicle power supply and the ground line for the other vehicle equipment such as electric parts can be reduced, the configuration considering such a case wherein a user performs maintenance of the electric parts can be simplified and the cost can be reduced.

Further, by changing the duty ratio of the pulse voltage of the inverter, the root-mean-square voltage to be applied to the other vehicle apparatus such as general electric parts can be readily adjusted.

Furthermore, by using the inverter without using a DC—DC converter, a power supply for general electric parts which is low in cost and high in efficiency can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply apparatus for an electric vehicle which includes a vehicle power supply for driving an electric motor and other vehicle equipment comprising:

intermediate voltage application means for setting a line defined by an intermediate voltage between a drive voltage and a ground voltage of said vehicle power supply as a ground line for said other vehicle equipment, and power supply means for producing a voltage to be applied to said other vehicle equipment based on the drive voltage of said vehicle power supply and the intermediate voltages, wherein said power supply means includes a power supply circuit operatively connected to an oscillator, a photo-coupler including a photo-diode and a photo-transistor, FETs Q1 and Q2, diodes, a capacitor and resistors for producing the voltage to be applied to the other vehicle equipment, and wherein when a voltage is supplied from a controller to the power supply circuit, the oscillator is rendered operative with a voltage from the power supply circuit, the oscillator outputs a pulse waveform turning on and off the FET Q1, and when the FET Q1 is turned on, the capacitor is charged, and when the FET Q1 is turned off, the photo-diode emits light and the photo-transistor is turned on such that a voltage from the capacitor is applied to the FET Q2 thereby turning on the FET Q2.

2. The power supply apparatus for an electric vehicle according to claim 1, wherein said power supply means produces a pulse voltage which varies high and low around the intermediate voltage.

3. The power supply apparatus for an electric vehicle according to claim 2, wherein said power supply means varies the duty ratio of the pulse voltage to adjust the voltage to be applied to said other vehicle equipment.

4. The power supply apparatus for an electric vehicle according to claim 1, wherein the intermediate voltage application means includes a node disposed between two batteries for providing the vehicle power supply.

5. The power supply apparatus for an electric vehicle according to claim 1, wherein the power supply means is an inverter for selectively supplying a predetermined intermediate voltage to said other vehicle equipment.

6. The power supply apparatus for an electric vehicle according to claim 5, wherein said inverter supplies plus or minus 24 V.

7. The power supply apparatus for an electric vehicle according to claim 5, wherein said inverter supplies plus or minus 12 V.

8. The power supply apparatus for an electric vehicle according to claim 1, wherein when the FET Q1 is turned on with a predetermined level, the capacitor is charged.

9. The power supply apparatus for an electric vehicle according to claim 8, wherein the FET Q1 is turned off, the photo-diode emits light and the photo-transistor is turned on for supplying current from the capacitor to the FET Q2.

10. A power supply apparatus adapted to be used with an electric vehicle adapted for receiving a vehicle power supply for driving an electric motor and other vehicle equipment comprising:
an intermediate voltage application device for providing an intermediate voltage between a drive voltage and a ground voltage of said vehicle power supply as a ground line adapted to be connected to said other vehicle equipment, and
power supply circuit for producing a voltage adapted to be applied to said other vehicle equipment based on the drive voltage of said vehicle power supply and the intermediate voltage,
wherein said power supply circuit is operatively connected to an oscillator, a photo-coupler including a photo-diode and a photo-transistor, FETs Q1 and Q2, diodes, a capacitor and resistors for producing the voltage to be applied to the other vehicle equipment,
wherein when a voltage is supplied from a controller to the power supply circuit, the oscillator is rendered operative with a voltage from the power supply circuit, the oscillator outputs a pulse waveform turning on and off the FET Q1, and when the FET Q1 is turned on, the capacitor is charged, and when the FET Q1 is turned off, the photo-diode emits light and the photo-transistor is turned on such that a voltage from the capacitor is applied to the FET Q2 thereby turning on the FET Q2.

11. The power supply apparatus adapted to be used with an electric vehicle according to claim 10, wherein said power supply circuit produces a pulse voltage which varies high and low around the intermediate voltage.

12. The power supply apparatus adapted to be used with an electric vehicle according to claim 11, wherein said power supply circuit varies the duty ratio of the pulse voltage to adjust the voltage to be applied to said other vehicle equipment.

13. The power supply apparatus adapted to be with an electric vehicle according to claim 10, wherein the intermediate voltage application device includes a node disposed between two batteries for providing the vehicle power supply.

14. The power supply apparatus adapted to be used with an electric vehicle according to claim 10, wherein the power supply circuit is an inverter for selectively supplying a predetermined intermediate voltage to said other vehicle equipment.

15. The power supply apparatus adapted to be used with an electric vehicle according to claim 14, wherein said inverter supplies plus or minus 24 V.

16. The power supply apparatus adapted to be used with an electric vehicle according to claim 14, wherein said inverter supplies plus or minus 12 V.

17. The power supply apparatus adapted to be used with an electric vehicle according to claim 10, wherein when the FET Q1 is turned on with a predetermined level of current the capacitor is charged.

18. The power supply apparatus adapted to be used with an electric vehicle according to claim 17, wherein the FET Q1 is turned off, the photo-diode emits light and the photo-transistor is turned on for supplying current from the capacitor to the FET Q2.

* * * * *